(12) United States Patent
Hasegawa et al.

(10) Patent No.: US 7,022,039 B2
(45) Date of Patent: Apr. 4, 2006

(54) LUBRICATION SYSTEM FOR PLANETARY TRANSMISSION

(75) Inventors: Nobuki Hasegawa, Peoria, IL (US);
Danny L. Hillman, Groveland, IL (US)

(73) Assignee: Komatsu America Corp., Peoria, IL (US)

( * ) Notice: Subject to any disclaimer, the term of this patent is extended or adjusted under 35 U.S.C. 154(b) by 59 days.

(21) Appl. No.: 10/776,320

(22) Filed: Feb. 12, 2004

(65) Prior Publication Data
US 2005/0059523 A1 Mar. 17, 2005

Related U.S. Application Data

(60) Provisional application No. 60/501,834, filed on Sep. 11, 2003.

(51) Int. Cl.
*F16H 57/04* (2006.01)
(52) U.S. Cl. .................................................. 475/159
(58) Field of Classification Search .............. 475/159, 475/160; 74/467; 184/6.12, 11.2
See application file for complete search history.

(56) References Cited

U.S. PATENT DOCUMENTS

| | | | |
|---|---|---|---|
| 2,943,517 A * | 7/1960 | Markley et al. ............. 475/159 |
| 3,230,796 A | 1/1966 | Thomson ..................... 475/159 |
| 3,475,992 A * | 11/1969 | West, Jr. et al. ............ 475/159 |
| 3,549,971 A | 12/1970 | Van Patten et al. .......... 318/293 |
| 3,650,353 A | 3/1972 | Abbott ....................... 184/6.12 |
| 3,741,037 A * | 6/1973 | Piret .......................... 475/159 |
| 3,937,300 A | 2/1976 | Avery ......................... 184/70 |
| 4,221,279 A | 9/1980 | Jones et al. .................. 74/467 |
| 4,359,142 A | 11/1982 | Schultz et al. ............... 74/467 |
| 4,567,784 A | 2/1986 | Hambric ...................... 74/467 |
| 4,573,373 A | 3/1986 | Shimizu et al. .............. 74/468 |
| 4,712,442 A | 12/1987 | Baika et al. .................. 74/467 |
| 4,957,187 A | 9/1990 | Burgess ..................... 184/6.12 |
| 5,328,419 A * | 7/1994 | Motl et al. .................. 475/324 |
| 5,368,528 A | 11/1994 | Farrell ........................ 475/159 |
| 5,467,667 A | 11/1995 | Zaiser et al. ............... 74/606 R |
| 5,472,383 A | 12/1995 | McKibbin .................... 475/159 |
| 5,667,036 A * | 9/1997 | Mueller et al. ............ 184/6.12 |
| 5,910,063 A | 6/1999 | Kato .......................... 475/159 |
| 5,976,048 A | 11/1999 | Sudau et al. ................ 475/159 |
| 6,039,667 A | 3/2000 | Schunck et al. ............ 475/159 |

\* cited by examiner

*Primary Examiner*—Sherry Estremsky
(74) *Attorney, Agent, or Firm*—Wenderoth, Lind & Ponack, L.L.P.

(57) ABSTRACT

A planetary transmission includes a first gear set including a first sun gear and at least one first planetary gear in meshing arrangement with the first sun gear, a second gear set including a second sun gear and at least one second planetary gear in meshing arrangement with the second sun gear, a casing surrounding the first gear set and the second gear set, a first thrust washer between the first sun gear and the second sun gear, a second thrust washer between the second sun gear and the casing, and a lubrication system. The lubrication system comprises a passageway extending through the casing and placing a hollow interior of the second sun gear in fluid communication with a mesh point between teeth of the second sun gear and teeth of the at least one second planetary gear, such that when oil is forced from the mesh point the oil travels through the passageway, into the hollow interior of the second sun gear, and into contact with the first and second thrust washers.

39 Claims, 6 Drawing Sheets

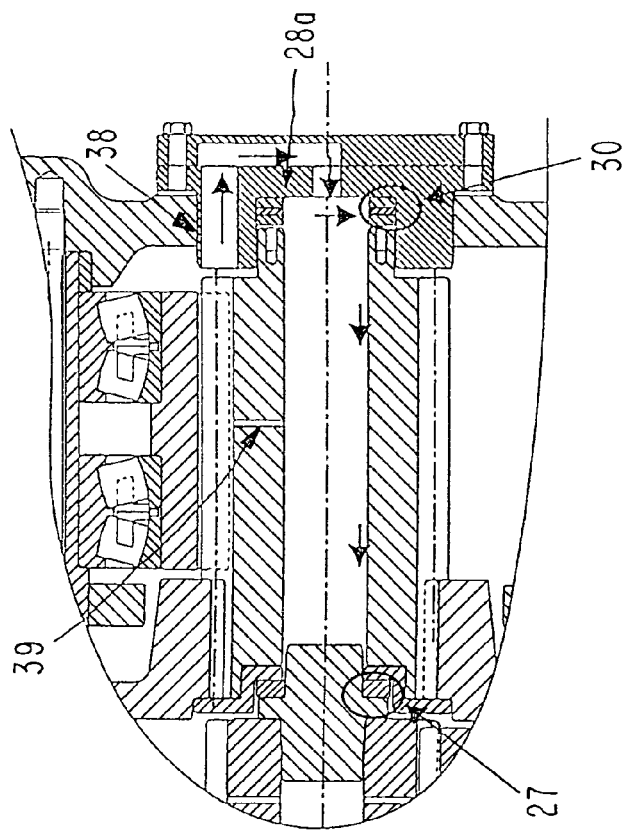
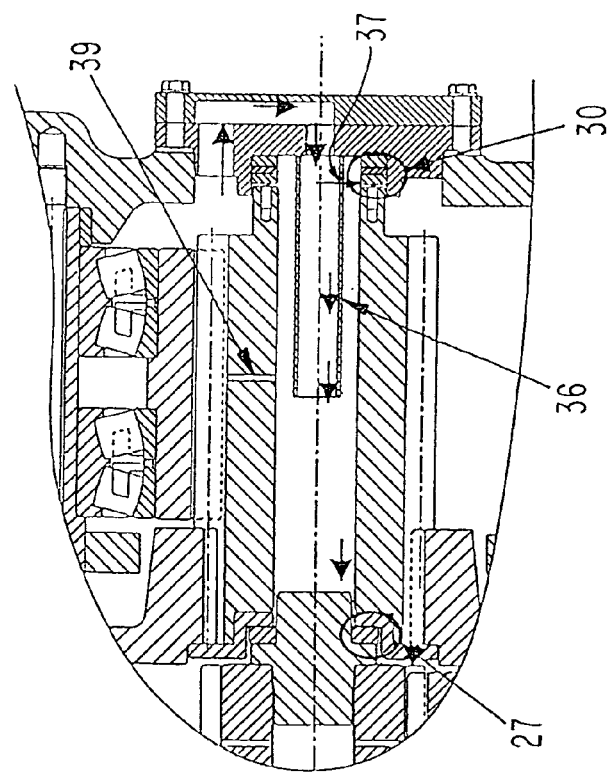

LUBRICATION SYSTEM FOR PLANETARY TRANSMISSION

This application claims the benefit of U.S. Provisional Application No. 60/501,834, filed Sep. 11, 2003.

BACKGROUND OF INVENTION

1. Field of the Invention

The instant invention pertains to a planetary transmission, and particularly to a lubrication system for the planetary transmission. The planetary transmission is mounted in a rear wheel of a mining or construction vehicle, and is used for transferring engine power to the wheel for vehicle movement. Adequate lubrication of thrust washers in this transmission is essential to prevent transmission failures and limit vehicle downtime.

2. Description of Related Art

A conventional planetary transmission and lubrication system therefor is shown in FIGS. 1 and 2. As shown in FIG. 1, a motor 1 drives a shaft 2. At a distal end of the shaft 2 is provided a first gear set 3 and a second gear set 4 of the planetary transmission. The planetary transmission serves to rotate ground engaging wheels 50, which are supported by a wheel hub.

As shown in FIG. 2, gear set 3 includes a carrier 8, a high speed sun gear 11, high speed planetary gears 12a–12c, and a high speed ring gear 13. The high speed sun gear is provided on an outer circumference of the shaft 2, via a splined connection or being welded thereto, so as to be non-rotatable relative to the shaft such that it rotates at the same speed as does the shaft. Surrounding the sun gear 11 and meshing therewith are the planetary gears 12a–12c. The high speed planetary gears 12a–12c are connected to the carrier 8 and supported via needle or roller bearings 7. Surrounding the high speed planetary gears 12a–12c is the ring gear 13 which meshes with the high speed planetary gears. The high speed ring gear 13 is fixed to frame 5 via bolts 6 so as to be non-rotatable.

With further reference to FIG. 2, gear set 4 includes a carrier 9, a low speed sun gear 21, low speed planetary gears 22a–22d, and a low speed ring gear 23. Surrounding the sun gear 21 and meshing therewith are the planetary gears 22a–22d. The low speed planetary gears 22a–22d are connected to the carrier 9 via needle or roller bearings 14. Surrounding the low speed planetary gears 22a–22d is the ring gear 23 which meshes with the low speed planetary gears. The low speed ring gear 23 is fixed to the high speed ring gear 13 via a splined connection so as to be non-rotatable relative thereto. The carrier 8 is splined to the low speed sun gear 21.

As shown in FIG. 2, a circumferential torque tube 19 is fixed to the carrier 9 via bolts 18, and is also fixed to wheel hub 16 via bolts 17. The wheel hub 16 is rotatably supported on the frame 5 via bearings 51, and accordingly, the wheel hub 16 rotates with the carrier 9 and the circumferential torque tube 19. An opening 24 is provided at a central portion of the carrier 9, which opening is aligned with a rotational axis of the shaft 2.

A plug 25 includes a first portion received within and fixed to the high speed sun gear 11, such that the plug is non-rotatable relative to the high speed sun gear. The plug 25 also includes a second portion that is received within the low speed sun gear 21 to support an inboard thrust washer 27. The second portion of the plug 25 is loosely received within the low speed sun gear 21 such that the plug, and thus the high speed sun gear 11, are rotatable relative to the low speed sun gear. The plug 25 also includes a cylindrical flange 26 between the first and second portions.

A loosely mounted retainer 15 surrounds the plug 25 and is positioned between the flange 26 and an end the low speed sun gear 21. The retainer 15 serves to maintain a proper position of the carrier 8 and the low speed sun gear 21. The inboard thrust washer 27 is positioned between the retainer 15 and the flange 26 of the plug 25. The inboard thrust washer is loosely mounted to the plug 25.

Attached to the carrier 9 via bolts 29, and covering opening 24, is a cover 28. The cover 28 defines a cylindrical recess on an inner surface thereof. Positioned within this recess between an opposite end of the low speed sun gear 21 and the inner surface of the cover 28 is an outboard thrust washer 30.

As is seen in FIG. 2, a passageway 39 extends through the low speed sun gear 21 from a root portion of the teeth to a hollow interior of the low speed sun gear.

In operation, upon actuation of the motor 1, shaft 2 is rotated at a high speed. Because the high speed sun gear 11 is splined or welded to the shaft 2, the high speed sun gear rotates with the shaft at the same rotational speed. Rotational output of the shaft 2 is transmitted to the high speed ring gear 13 because of the meshing arrangement of the high speed sun gear and the high speed planetary gears 12a–12c, and the meshing arrangement of the high speed planetary gears and the high speed ring gear. Because the high speed ring gear 13 is fixed to the frame 5, and because the high speed planetary gears 12a–12c are connected to the carrier 8, the rotational output of the shaft 2 results in rotation of carrier 8. Rotational output of the carrier 8 is transmitted to the low speed sun gear 21 due to the splined connection between the low speed sun gear and this carrier.

Then, because of the meshing relationship between the low speed sun gear 21 and the low speed planetary gears 22a–22d, and because of the meshing relationship between the low speed planetary gears and the low speed ring gear 23, rotational output of the low speed sun gear is transmitted to low speed ring gear. Because the low speed ring gear 23 is splined to the high speed ring gear 13, and because the high speed ring gear is fixed to the frame 5, the low speed ring gear is also rotationally fixed. Accordingly, because the low speed planetary gears 22a–22d are connected to the carrier 9, rotational output of the low speed sun gear 21 results in rotation of carrier 9. And, because of carrier 9 being bolted to circumferential torque tube 19, which in turn is bolted to wheel hub 16, rotation of carrier 9 results in rotation of the wheel hub 16 at a reduced speed relative to the rotational speed of the shaft 2.

As should be clear from the above description, the low speed sun gear 21 rotates relative to the plug 25, and accordingly, the inboard thrust washer 27 is subject to frictional forces which can result in wear, overheating and breakage of this washer if not sufficiently lubricated. Similarly, the carrier 9, and thus the cover 28, rotates at a slower speed than does the low speed sun gear 21, and accordingly, the outboard thrust washer 30 can also be severely damaged if not sufficiently lubricated.

In order to lubricate the thrust washers 27 and 30 oil is forced through passageway 39. Upon entering the hollow interior portion of the low speed sun gear, through passageway 39, the oil lubricates the thrust washers 27 and 30. However, because of the arrangement of passageway 39, a sufficient amount of oil is not always conveyed to the thrust washers such that they are not sufficiently lubricated and become excessively worn.

OBJECT OF THE INVENTION

An object of the invention is to provide a system that provides adequate lubrication to inboard and outboard thrust washers of a planetary transmission as described above.

To meet this object, a passageway is provided that extends through the cover and into the hollow interior of the low speed sun gear. Oil is forced by meshing gear teeth through this passageway and into the hollow interior of the low speed sun gear. The provision of this passageway in the cover allows for sufficient oil to be applied to each of the thrust washers so as to prevent excessive wear, as is realized in the conventional planetary transmission.

SUMMARY OF THE INVENTION

First Aspect

In accordance with a first aspect of the invention, provided is a lubrication system for a planetary transmission that includes a first gear set including a first sun gear and at least one first planetary gear in meshing arrangement with the first sun gear, a second gear set including a second sun gear and at least one second planetary gear in meshing arrangement with the second sun gear, a casing surrounding the first gear set and the second gear set, a first thrust washer between the first sun gear and the second sun gear, and a second thrust washer between the second sun gear and the casing. The lubrication system comprises a passageway extending through the casing and placing a hollow interior of the second sun gear in fluid communication with a mesh point between teeth of the second sun gear and teeth of the at least one second planetary gear, such that when oil is forced from the mesh point the oil travels through the passageway, into the hollow interior of the second sun gear, and into contact with the first and second thrust washers.

The casing includes an opening in alignment with the second sun gear and a cover closing the opening, with the second thrust washer being between the second sun gear and the cover, and with the passageway extending through the cover. The cover includes a first portion and a second portion that are bolted together, and the passageway includes a first opening extending through the first portion, a second opening extending through the first portion, and a cavity in the second portion interconnecting the first opening and the second opening. Accordingly, when oil is forced from the mesh point the oil travels through the first opening, then through the cavity, and then through the second opening into the hollow interior of the second sun gear.

The lubrication system can further comprise a first tubular extension extending from the second opening into the hollow interior of the second sun gear and toward the first thrust washer, and a hole in a sidewall of the first tubular extension, with the hole being positioned above the second thrust washer so as to allow oil to flow through the hole and into contact with the second thrust washer.

The lubrication system can further comprise a second tubular extension extending from the first opening toward the mesh point between the teeth of the second sun gear and the teeth of the at least one second planetary gear.

The lubrication system can further comprise a third opening extending through the second sun gear from a root portion of teeth thereof to the hollow interior of the second sun gear so as to allow oil to flow through the third opening into the hollow interior of the second sun gear.

Second Aspect

In accordance with a second aspect of the invention, provided is a planetary transmission which comprises a first gear set including a first sun gear and at least one first planetary gear in meshing arrangement with the first sun gear, a second gear set including a second sun gear and at least one second planetary gear in meshing arrangement with the second sun gear, a casing surrounding the first gear set and the second gear set, a first thrust washer between the first sun gear and the second sun gear, a second thrust washer between the second sun gear and the casing, and a lubrication system including a passageway extending through the casing and placing the hollow interior of the second sun gear in fluid communication with a mesh point between teeth of the second sun gear and teeth of the at least one second planetary gear. The passageway is arranged such that when oil is forced from the mesh point the oil travels through the passageway, into a hollow interior of the second sun gear, and into contact with the first and second thrust washers.

The casing includes an opening in alignment with the second sun gear and a cover closing the opening, with the second thrust washer being between the second sun gear and the cover, and with the passageway extending through the cover. The cover includes a first portion and a second portion that are bolted together, and the passageway includes a first opening extending through the first portion, a second opening extending through the first portion, and a cavity in the second portion interconnecting the first opening and the second opening. Accordingly, when oil is forced from the mesh point the oil travels through the first opening, then through the cavity, and then through the second opening into the hollow interior of the second sun gear.

The lubrication system can further comprise a first tubular extension extending from the second opening into the hollow interior of the second sun gear and toward the first thrust washer, and a hole in a sidewall of the first tubular extension, with the hole being positioned above the second thrust washer so as to allow oil to flow through the hole and into contact with the second thrust washer.

The lubrication system can further comprise a second tubular extension extending from the first opening toward the mesh point between the teeth of the second sun gear and the teeth of the at least one second planetary gear.

The lubrication system can further comprise a third opening extending through the second sun gear from a root portion of teeth thereof to the hollow interior of the second sun gear so as to allow oil to flow through the third opening into the hollow interior of the second sun gear.

Third Aspect

In accordance with a third aspect of the invention, provided is a vehicle that comprises a ground engaging wheel and a planetary transmission for driving the ground engaging wheel. The planetary transmission includes a first gear set including a first sun gear and at least one first planetary gear in meshing arrangement with the first sun gear, a second gear set including a second sun gear and at least one second planetary gear in meshing arrangement with the second sun gear, a casing surrounding the first gear set and the second gear set, a first thrust washer between the first sun gear and the second sun gear, a second thrust washer between the second sun gear and the casing, and a lubrication system including a passageway extending through the casing and placing the hollow interior of the second sun gear in fluid communication with a mesh point between teeth of the second sun gear and teeth of the at least one second planetary gear. The passageway is arranged such that when oil is forced from the mesh point the oil travels through the passageway, into a hollow interior of the second sun gear, and into contact with the first and second thrust washers. The casing includes an opening in alignment with the second sun gear and a cover closing the opening, with the second thrust washer being between the second sun gear and the cover, and with the passageway extending through the cover. The cover includes a first portion and a second portion that are bolted together, and the passageway includes a first opening extending through the first portion, a second opening extending through the first portion, and a cavity in the second portion interconnecting the first opening and the second opening. Accordingly, when oil is forced from the mesh point the oil travels through the first opening, then through the cavity, and then through the second opening into the hollow interior of the second sun gear.

The lubrication system can further comprise a first tubular extension extending from the second opening into the hollow interior of the second sun gear and toward the first thrust washer, and a hole in a sidewall of the first tubular extension, with the hole being positioned above the second thrust washer so as to allow oil to flow through the hole and into contact with the second thrust washer.

The lubrication system can further comprise a second tubular extension extending from the first opening toward the mesh point between the teeth of the second sun gear and the teeth of the at least one second planetary gear.

The lubrication system can further comprise a third opening extending through the second sun gear from a root portion of teeth thereof to the hollow interior of the second sun gear so as to allow oil to flow through the third opening into the hollow interior of the second sun gear.

Fourth Aspect

In accordance with a fourth aspect of the invention, provided is a method for lubricating first and second thrust washers in a planetary transmission. The planetary transmission includes a first gear set including a first sun gear and at least one first planetary gear in meshing arrangement with the first sun gear, a second gear set including a second sun gear and at least one second planetary gear in meshing arrangement with the second sun gear, a casing surrounding the first gear set and the second gear set, the first thrust washer between the first sun gear and the second sun gear, the second thrust washer between the second sun gear and the casing, and a lubrication system including a passageway extending through the casing and placing the hollow interior of the second sun gear in fluid communication with a mesh point between teeth of the second sun gear and teeth of the at least one second planetary gear.

The method comprises forcing oil from the mesh point, through the passageway, into a hollow interior of the second sun gear, and into contact with the first and second thrust washers.

The casing includes an opening in alignment with the second sun gear and a cover closing the opening, with the second thrust washer being between the second sun gear and the cover, and with the passageway extending through the cover, such that forcing oil from the mesh point, through the passageway, into the hollow interior of the second sun gear and into contact with the first and second thrust washers comprises forcing oil from the mesh point, through the cover, into the hollow interior of the second sun gear, and into contact with the first and second thrust washers.

The cover includes a first portion and a second portion that are bolted together, and the passageway includes a first opening extending through the first portion, a second opening extending through the first portion, and a cavity in the second portion interconnecting the first opening and the second opening, such that forcing said oil from the mesh point, through the cover and into the hollow interior of the second sun gear comprises forcing the oil from the mesh point, through the first opening, then through the cavity, and then through the second opening into the hollow interior of the second sun gear.

The planetary transmission can further include a first tubular extension extending from the second opening into the hollow interior of the second sun gear and toward the first thrust washer, such that forcing the oil from the mesh point, through the first opening, then through the cavity, and then through the second opening into the hollow interior of the second sun gear comprises forcing the oil from the mesh point, through the first opening, then through the cavity, then through the second opening, then through the first tubular extension into the hollow interior of the second sun gear.

A hole can be provided in a sidewall of the first tubular extension and positioned above the second thrust washer, such that forcing the oil through the first tubular extension into the hollow interior of the second sun gear comprises forcing the oil through the hole and through an open end of the first tubular extension into the hollow interior of the sun gear.

The planetary transmission can further include a second tubular extension extending from the first opening toward the mesh point between the teeth of the second sun gear and the teeth of the at least one second planetary gear, such that forcing the oil from the mesh point through the first opening comprises forcing the oil from the mesh point, through the second tubular extension, and then through the first opening.

Also, a third opening can extend through the second sun gear from a root portion of teeth thereof to the hollow interior of the second sun gear, and the method can further comprise forcing oil through the third opening into the hollow interior of the second gear.

Fifth Aspect

In accordance with a fifth aspect of the invention, provided is a method of modifying a planetary transmission that includes a first gear set including a first sun gear and at least one first planetary gear in meshing arrangement with the first sun gear, a second gear set including a second sun gear and at least one second planetary gear in meshing arrangement with the second sun gear, and a casing surrounding the first gear set and the second gear set, wherein the casing includes an opening in alignment with the second sun gear and a cover closing the opening. A first thrust washer is between the first sun gear and the second sun gear, and a second thrust washer is between the second sun gear and the cover.

The method comprises defining a passageway that extends through the cover and places a hollow interior of the second sun gear in fluid communication with a mesh point between teeth of the second sun gear and teeth of the at least one second planetary gear, such that when oil is forced from the mesh point the oil travels through the passageway, into the hollow interior of the second sun gear, and into contact with the first and second thrust washers.

Defining the passageway that extends through the cover comprises forming in the cover a first opening that is aligned with the mesh point between the teeth of the second sun gear and the teeth of the at least one second planetary gear, forming in the cover a second opening that is aligned with the hollow interior of the second sun gear, and bolting a cover piece to the cover, wherein the cover piece has a cavity therein that interconnects the first opening and the second opening. Accordingly, when oil is forced from the mesh point the oil travels through the first opening, then through the cavity, and then through the second opening into the hollow interior of the second sun gear.

The method can further comprise providing a first tubular extension that extends from the second opening into the hollow interior of the second sun gear and toward the first thrust washer.

The method can further comprise providing a hole in a sidewall of the first tubular extension, wherein the hole is positioned above the second thrust washer.

The method can further comprise providing a second tubular extension that extends from the first opening toward the mesh point between the teeth of the second sun gear and the teeth of the at least one second planetary gear.

The planetary transmission prior to being modified can also have an opening extending through the second sun gear from a root portion of teeth thereof to the hollow interior of the second sun gear, such that after modification oil can be forced through this opening to further lubricate the thrust washers.

BRIEF DESCRIPTION OF THE DRAWINGS

FIG. 5A shows a modification of the lubrication system.

FIG. 5B shows another modification of the lubrication system.

DETAILED DESCRIPTION OF THE PREFERRED EMBODIMENTS

Figure 1:
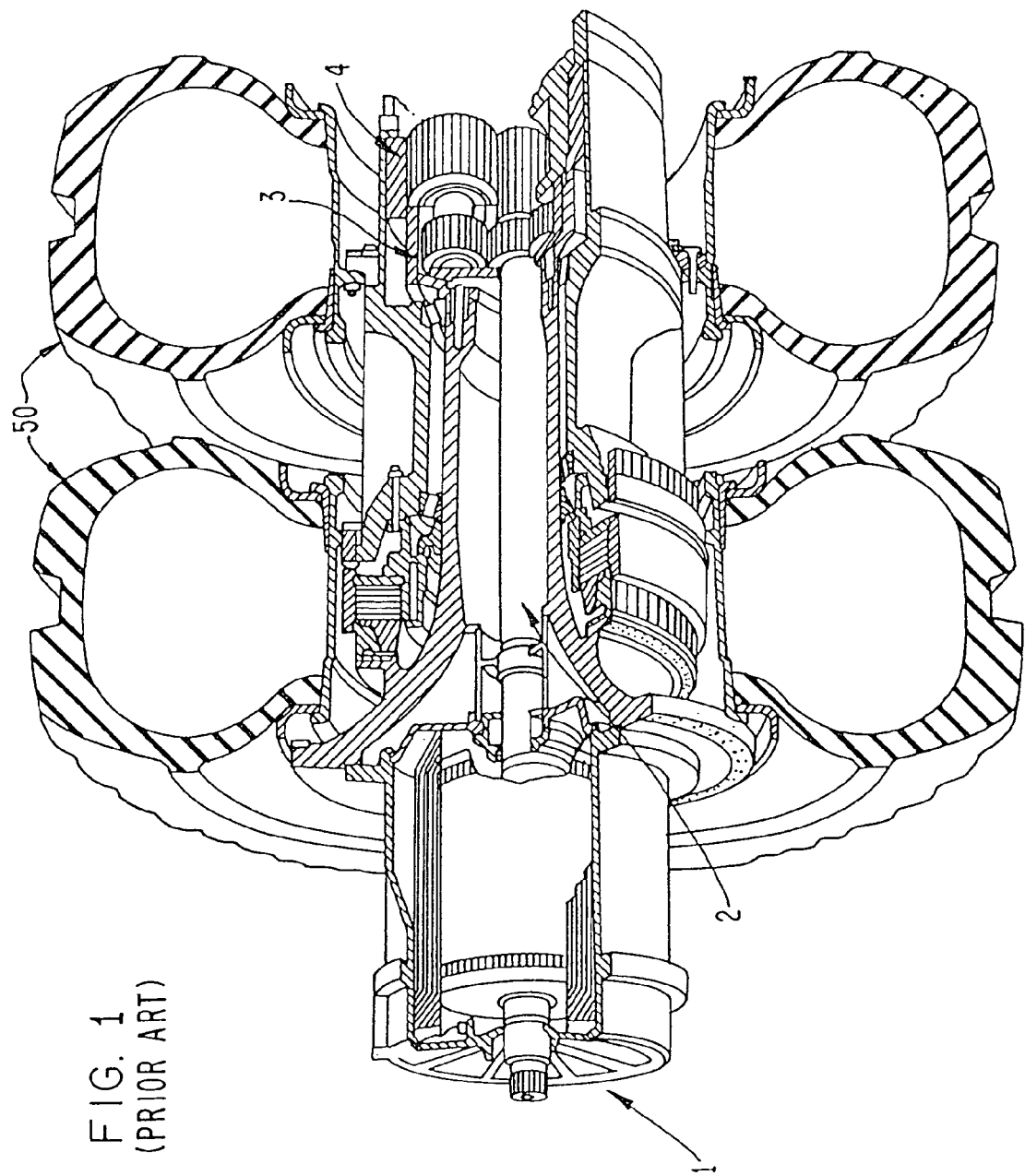
FIG. 1 is a perspective view of a conventional planetary transmission in combination with ground engaging wheels.
Figure 2:
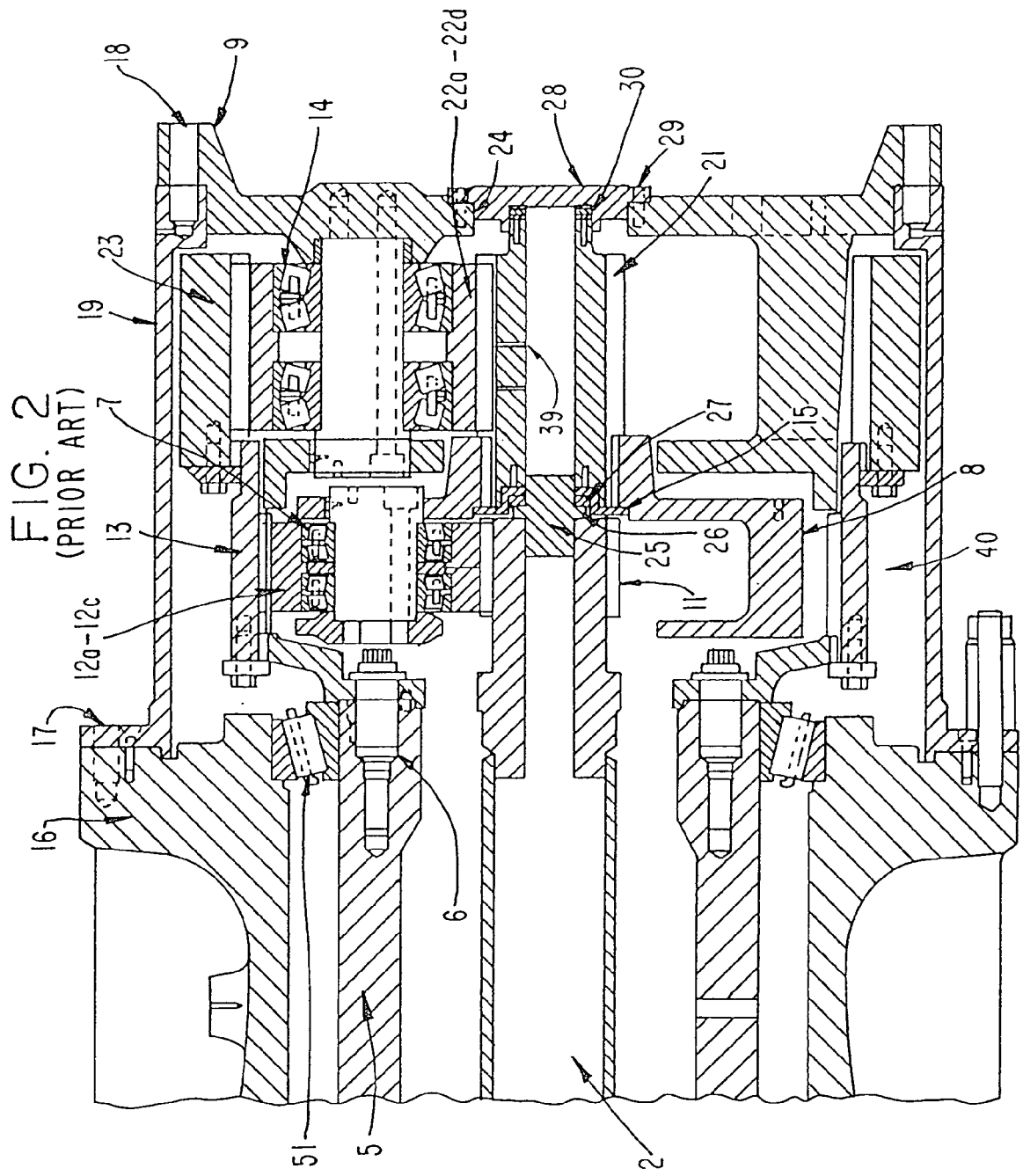
FIG. 2 is a schematic view of the conventional planetary transmission.

The lubrication system according to the invention is to be used with a planetary transmission that is basically the same as that of the conventional planetary transmission as shown and described with reference to FIGS. 1 and 2. However, though three high speed planetary gears are shown, there can be more or less than three high speed planetary gears. Also, though four low speed planetary gears are shown, there can be more or less than four low speed planetary gears. Additionally, though the carrier 9 and the circumferential torque tube 19 are shown as two separate pieces, these members can be formed from a single monolithic member. Furthermore, the inboard thrust washer 27 can be fixed to the plug 25.

Figure 3:
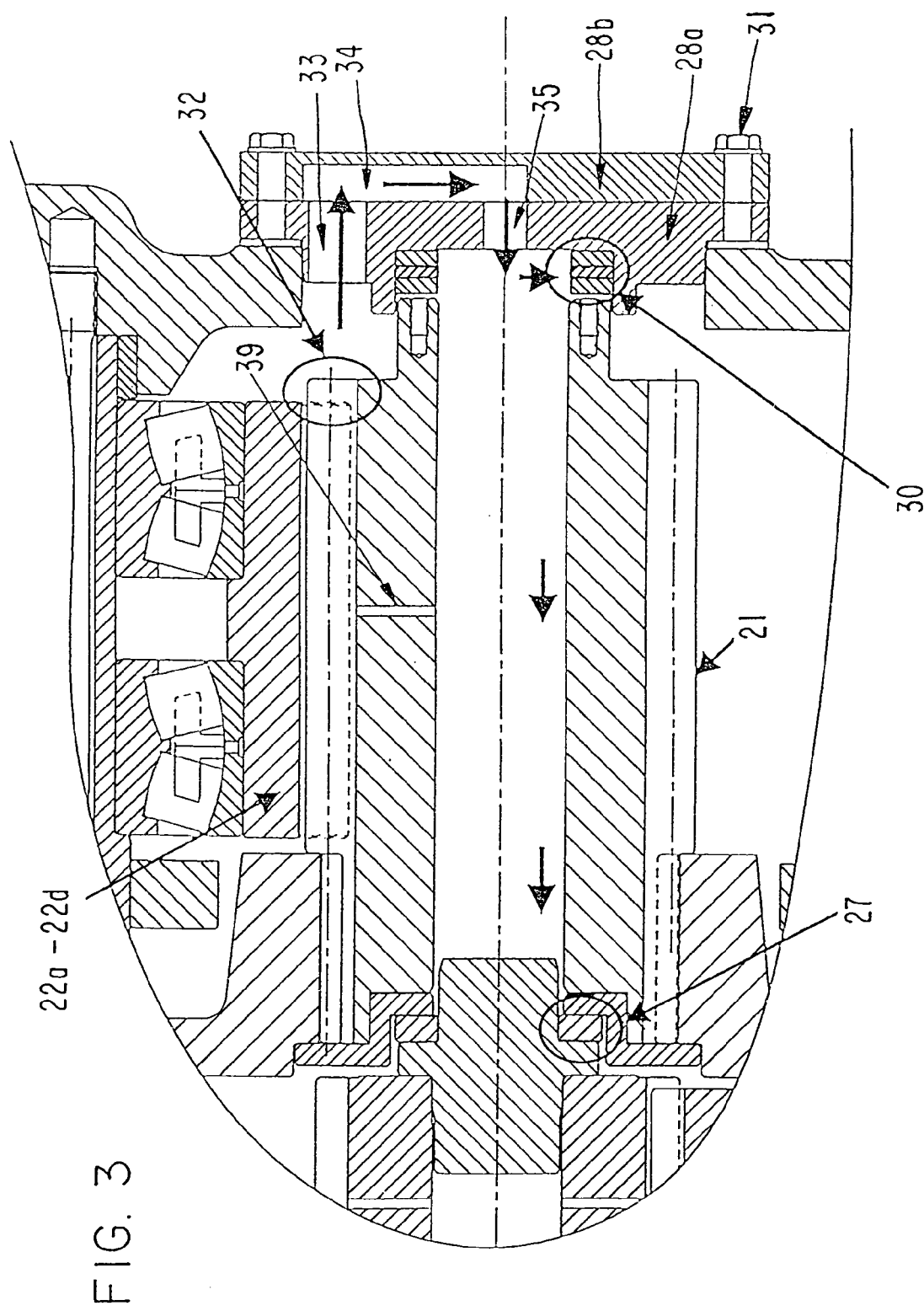
FIG. 3 is an enlarged view of a lubrication system of a planetary transmission according to the invention.

As shown in FIG. 3, the lubrication system functions to supply oil, along a path indicated by arrows, to inboard thrust washer 27 and outboard thrust washer 30. With reference to FIG. 3, the cover includes a first part 28a and second part 28b which is bolted to the first part via bolts 31. Oil flows from a mesh point 32 of low speed sun gear 21 and a corresponding one of low speed planetary gears 22a–22d, through the first and second parts 28a and 28b, and then into a hollow interior of the low speed sun gear to the inboard thrust washer 27 and the outboard thrust washer 30.

Figure 4A:
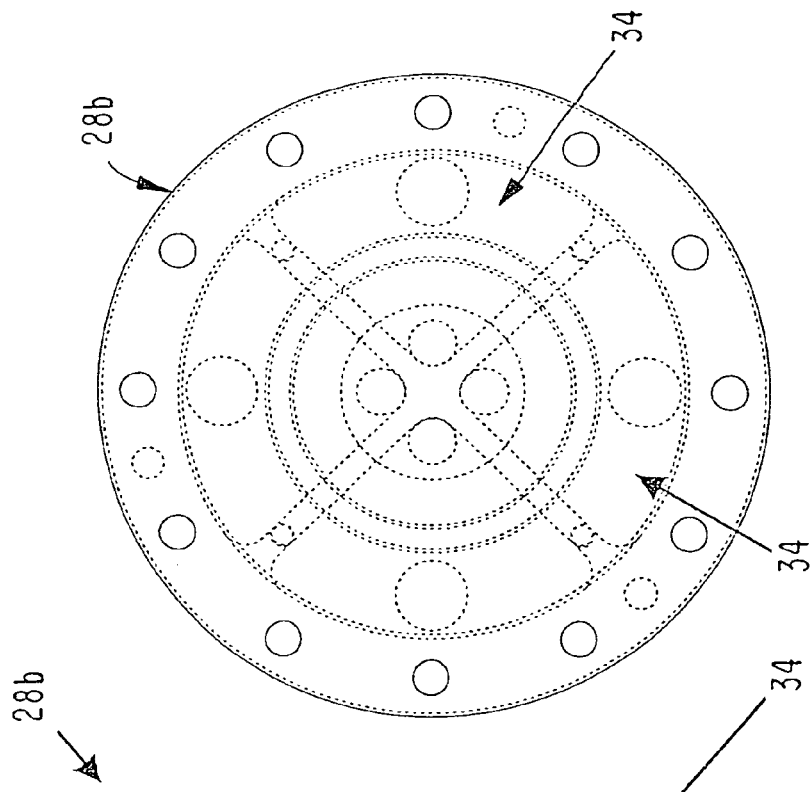
FIGS. 4A and 4C show planar views of a cover of the lubrication system from a front side and a back side, respectively.
Figure 4B:
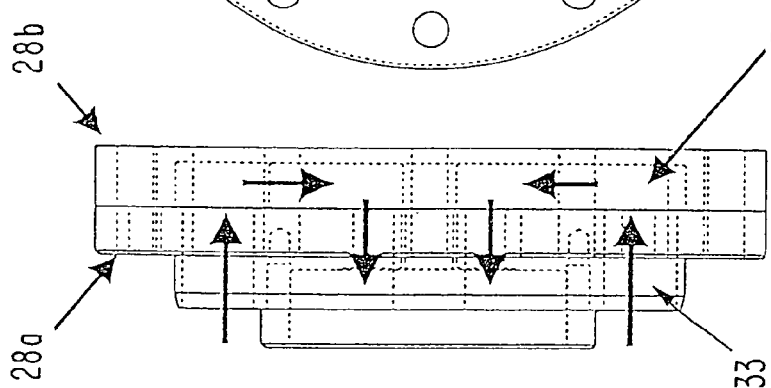
FIG. 4B shows a cross sectional view of the cover.
Figure 4C:
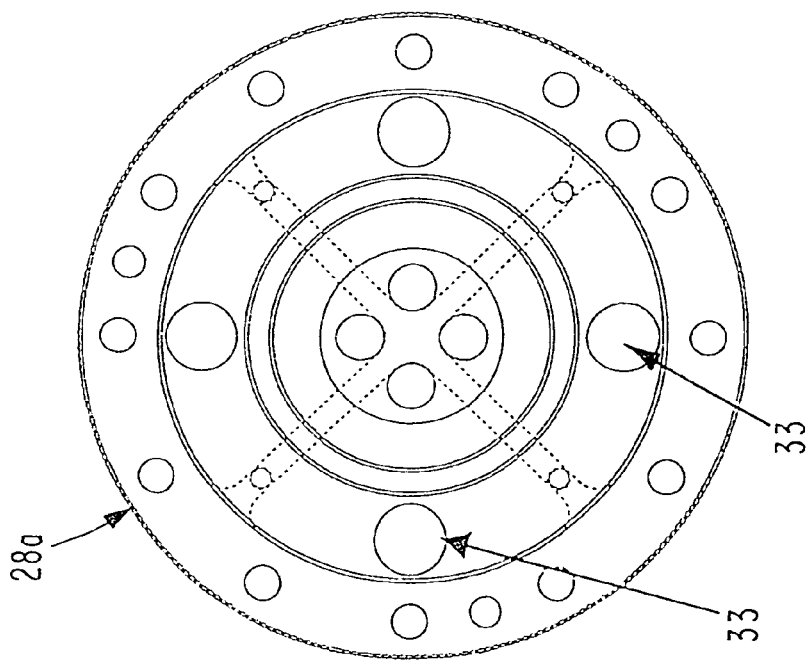

Specifically, the oil flows from the mesh point 32, into and through axially extending opening 33 of the first part 28a, into and through cavity 34 of the second part 28b, into and through axially extending opening 35 of the first part 28a, and then into the hollow interior of the low speed sun gear 21. Opening 33 is aligned with the mesh point 32 and located between a center of the first part 28a and an outer periphery of the first part 28a, opening 35 is located radially between the center of the first part and the opening 33, and cavity 34 fluidly interconnects opening 33 and opening 35. This is more clearly shown in FIG. 4. With reference to FIG. 4, there may be one opening 33 provided for each low speed planetary gear, or there may be fewer openings 33 than there are low speed planetary gears. Also, because the cover and the low speed planetary gears 22a–22d are attached to carrier 9, mesh point(s) 32 remain in alignment with respective opening(s) 33 during rotation of the cover.

To flow the oil from the mesh point 32 into opening 33, the oil is squeezed from between teeth of the corresponding one of low speed planetary gears 22a–22d and teeth of the low speed sun gear 21 into opening 33. Specifically, the low speed planetary gears 22a–22d, upon rotation thereof, travel through an oil sump 40 and splash oil removed from the oil sump to an area located inwardly of the ring gear 23 such that oil is supplied to and between the teeth of the low speed sun gear 21, the teeth of the low speed planetary gears, and the teeth of the low speed ring gear 23, and thus lubricates these gears. As the teeth of the low speed sun gear 21 mesh with the teeth of the low speed planetary gears 22a–22d, a space between these teeth is reduced such that oil between the teeth is squeezed or forced in axial directions of the gears so as to flow through opening 33, then through the cavity 34 towards a center of the second part 28b, and then through the opening 35 into the hollow portion of the low speed sun gear 21. Once inside the hollow portion of the low speed sun gear 21, centrifugal force caused by rotation of the low speed sun gear ensures that the inboard thrust washer 27 and outboard thrust washer 30 are sufficiently lubricated by the oil. After lubricating the inboard thrust washer 27 and the outboard thrust washer 30, the oil returns to the oil sump 40.

Incidentally, the high speed sun gear 11, high speed planetary gears 12a–12c, and the high speed ring gear 13 are lubricated in a similar manner by which the low speed gears are lubricated, i.e. via the high speed planetary gears rotating through an oil sump and splashing oil onto the high speed gears.

Though the cover is shown to be made of two separate parts 28a and 28b, the cover can be a single monolithic part having the openings 33 and 35, and the cavity 34, formed therein. Also, though the openings 33 and 35 are shown to extend parallel to the axis of the shaft 2, these openings can be angled relative to the axis of the shaft.

As shown in FIG. 5a, extending from an inner portion of the first part 28a in a direction toward the inboard thrust washer 27, can be an extension tube 36. There can be one extension tube 36 aligned with each opening 35, or there may be one extension tube that is positioned to receive oil from plural openings 35. The extension tube 36 enhances delivery of oil to the inboard thrust washer 27 by directing the oil to a position close to the inboard thrust washer. In a side wall of this extension tube 36 is provided an opening 37 positioned in radial alignment with the outboard thrust washer 30, through which opening oil flows, such that the outboard thrust washer is adequately lubricated by the oil flowing through the cover 28.

Further, as shown in FIG. 5b, an extension 38 can extend from an inner surface of the first part 28a and is in alignment with the mesh point 32 of the low speed sun gear 21 and its corresponding low speed planetary gear 22a–22d. Accordingly, this extension 38 enhances flow of oil from the mesh point of the low speed sun gear 21 and its corresponding low speed planetary gear 22*a*–22*d* into and through the opening 33 by causing a greater amount of oil to be directed to the opening 33.

The extension tube 36 and extension 38 can be used in combination with one another, or can be used separately.

Additionally as shown in FIG. 3, the passageway 39, which extends through the low speed sun gear from a root portion of the teeth to the hollow interior portion of the low speed sun gear, can be used to supply oil to the hollow interior of the low speed sun gear so as to lubricate the thrust washers.

Figure 6A:
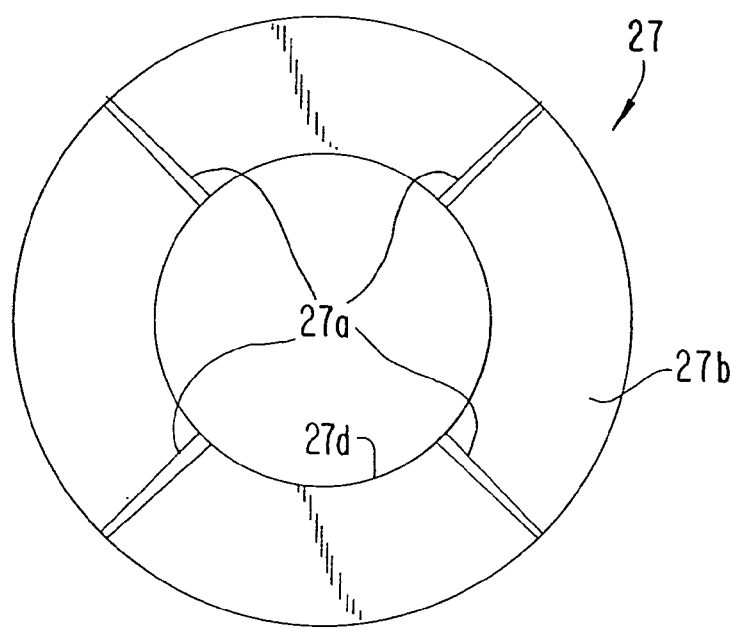
FIGS. 6A and 6B show perspective views of a thrust washer from a front side and back side, respectively, of the planetary transmission according to the invention.
Figure 6B:
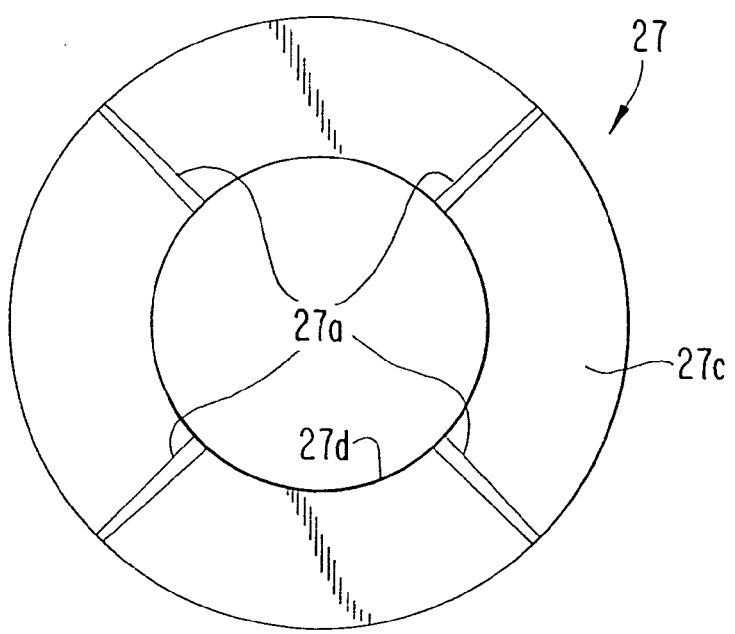

As shown in FIGS. 6A and 6B, the inboard thrust washer 27 is a bronze washer with four radially extending grooves 27*a* in both radial faces 27*b*, 27*c* thereof, as well as in an inner circumferential face 27*d* thereof. On each radial face 27*b*, 27*c*, the grooves 27*a* are spaced at 90 intervals, and each groove tapers in a direction from an inner periphery of the thrust washer 27 to an outer periphery of the thrust washer. At the inner periphery of the thrust washer 27 each groove 27*a* is about 0.25 inches wide, and at the outer periphery of the thrust washer each groove is about 0.12 inches wide. These grooves 27*a* allow for oil to be adequately conveyed along the radial faces 27*b*, 27*c* of the thrust washer 27, and back into the sump 40.

The outboard thrust washer 30 is a combination of three distinct members, i.e. a bronze washer member sandwiched between two steel washer members. The bronze washer member is of the same general configuration as that of inboard thrust washer 27 as described above. Instead of the tri-part construction of the outboard thrust washer 30, this washer can be a single bronze washer of the same general configuration as that of inboard thrust washer 27 as described above.

We claim:

1. A lubrication system for a planetary transmission having
   (i) a first gear set including a first sun gear and at least one first planetary gear in meshing arrangement with the first sun gear,
   (ii) a second gear set including a second sun gear and at least one second planetary gear in meshing arrangement with the second sun gear, the second sun gear having a hollow interior,
   (iii) a casing surrounding the first gear set and the second gear set,
   (iv) a first thrust washer between the first sun gear and the second sun gear, and
   (v) a second thrust washer between the second sun gear and the casing, said lubrication system comprising:
   a passageway extending through the casing and placing the hollow interior of the second sun gear in fluid communication with a mesh point between teeth of the second sun gear and teeth of the at least one second planetary gear, such that when oil is forced from the mesh point the oil travels through said passageway, into the hollow interior of the second sun gear, and into contact with the first and second thrust washers.

2. The lubrication system according to claim 1, wherein the casing includes an opening in alignment with the second sun gear and a cover closing the opening, with the second thrust washer being between the second sun gear and the cover, and wherein said passageway extends through the cover.

3. The lubrication system according to claim 2, wherein the cover includes a first portion and a second portion that are bolted together, and wherein said passageway includes a first opening extending through the first portion, a second opening extending through the first portion, and a cavity in the second portion interconnecting said first opening and said second opening,
   such that when oil is forced from the mesh point the oil travels through said first opening, then through said cavity, and then through said second opening into the hollow interior of the second sun gear.

4. The lubrication system according to claim 3, further comprising:
   a first tubular extension extending from said second opening into the hollow interior of the second sun gear and toward the first thrust washer.

5. The lubrication system according to claim 4, further comprising:
   a hole in a sidewall of said first tubular extension, said hole being positioned above the second thrust washer so as to allow oil to flow through said hole and into contact with the second thrust washer.

6. The lubrication system according to claim 4, further comprising:
   a second tubular extension extending from said first opening toward the mesh point between the teeth of the second sun gear and the teeth of the at least one second planetary gear.

7. The lubrication system according to claim 3, further comprising:
   a third opening extending through the second sun gear from a root portion of teeth thereof to the hollow interior of the second sun gear so as to allow oil to flow through the third opening into the hollow interior of the second sun gear.

8. A planetary transmission comprising:
   a first gear set including a first sun gear and at least one first planetary gear in meshing arrangement with said first sun gear;
   a second gear set including a second sun gear and at least one second planetary gear in meshing arrangement with said second sun gear, said second sun gear having a hollow interior;
   a casing surrounding said first gear set and said second gear set;
   a first thrust washer between said first sun gear and said second sun gear;
   a second thrust washer between said second sun gear and said casing; and
   a lubrication system including a passageway extending through said casing and placing said hollow interior of said second sun gear in fluid communication with a mesh point between teeth of said second sun gear and teeth of said at least one second planetary gear, such that when oil is forced from the mesh point the oil travels through said passageway, into said hollow interior of said second sun gear, and into contact with said first and second thrust washers.

9. The planetary transmission according to claim 8, wherein
   said casing includes an opening in alignment with said second sun gear and a cover closing said opening, with said second thrust washer being between said second sun gear and said cover, and
   said passageway extends through said cover.

10. The planetary transmission according to claim 9, wherein
    said cover includes a first portion and a second portion that are bolted together, and said passageway includes a first opening extending through said first portion, a second opening extending through said first portion, and a cavity in said second portion interconnecting said first opening and said second opening, such that when oil is forced from the mesh point the oil travels through said first opening, then through said cavity, and then through said second opening into said hollow interior of said second sun gear.

11. The planetary transmission according to claim 10, further comprising:
a first tubular extension extending from said second opening into said hollow interior of said second sun gear and toward said first thrust washer.

12. The planetary transmission according to claim 11, further comprising:
a hole in a sidewall of said first tubular extension, said hole being positioned above said second thrust washer so as to allow oil to flow through said hole and into contact with said second thrust washer.

13. The planetary transmission according to claim 11, further comprising:
a second tubular extension extending from said first opening toward the mesh point between the teeth of said second sun gear and the teeth of said at least one second planetary gear.

14. The planetary transmission according to claim 10, further comprising:
a third opening extending through said second sun gear from a root portion of teeth thereof to said hollow interior of said second sun gear so as to allow oil to flow through said third opening into said hollow interior of said second sun gear.

15. A vehicle comprising:
a ground engaging wheel; and
a planetary transmission for driving said ground engaging wheel, said planetary transmission including
  (i) a first gear set including a first sun gear and at least one first planetary gear in meshing arrangement with said first sun gear,
  (ii) a second gear set including a second sun gear and at least one second planetary gear in meshing arrangement with said second sun gear, said second sun gear having a hollow interior,
  (iii) a casing surrounding said first gear set and said second gear set,
  (iv) a first thrust washer between said first sun gear and said second sun gear,
  (v) a second thrust washer between said second sun gear and said casing, and
  (vi) a lubrication system including a passageway extending through said casing and placing said hollow interior of said second sun gear in fluid communication with a mesh point between teeth of said second sun gear and teeth of said at least one second planetary gear, such that when oil is forced from the mesh point the oil travels through said passageway, into said hollow interior of said second sun gear, and into contact with said first and second thrust washers.

16. The vehicle according to claim 15, wherein
said casing includes an opening in alignment with said second sun gear and a cover closing said opening, with said second thrust washer being between said second sun gear and said cover, and
said passageway extends through said cover.

17. The vehicle according to claim 16, wherein
said cover includes a first portion and a second portion that are bolted together, and
said passageway includes a first opening extending through said first portion, a second opening extending through said first portion, and a cavity in said second portion interconnecting said first opening and said second opening,
such that when oil is forced from the mesh point the oil travels through said first opening, then through said cavity, and then through said second opening into said hollow interior of said second sun gear.

18. The vehicle according to claim 17, further comprising:
a first tubular extension extending from said second opening into said hollow interior of said second sun gear and toward said first thrust washer.

19. The vehicle according to claim 18, further comprising:
a hole in a sidewall of said first tubular extension, said hole being positioned above said second thrust washer so as to allow oil to flow through said hole and into contact with said second thrust washer.

20. The vehicle according to claim 18, further comprising:
a second tubular extension extending from said first opening toward the mesh point between the teeth of said second sun gear and the teeth of said at least one second planetary gear.

21. The vehicle according to claim 17, further comprising:
a third opening extending through said second sun gear from a root portion of teeth thereof to said hollow interior of said second sun gear so as to allow oil to flow through said third opening into said hollow interior of said second sun gear.

22. A lubricating method in a planetary transmission including
  (i) a first gear set including a first sun gear and at least one first planetary gear in meshing arrangement with said first sun gear,
  (ii) a second gear set including a second sun gear and at least one second planetary gear in meshing arrangement with said second sun gear, said second sun gear having a hollow interior,
  (iii) a casing surrounding said first gear set and said second gear set, with said casing having a passageway extending therethrough which places said hollow interior of said second sun gear in fluid communication with a mesh point between teeth of said second sun gear and teeth of said at least one second planetary gear,
  (iv) a first thrust washer between said first sun gear and said second sun gear, and
  (v) a second thrust washer between said second sun gear and said casing, said method comprising:
forcing oil from said mesh point, through said passageway, into said hollow interior of said second sun gear, and into contact with said first and second thrust washers.

23. The method according to claim 22, wherein
said casing includes an opening in alignment with said second sun gear and a cover closing said opening, with said second thrust washer being between said second sun gear and said cover, and
said passageway extends through said cover,
such that forcing oil from said mesh point, through said passageway, into said hollow interior of said second sun gear and into contact with said first and second thrust washers comprises forcing oil from said mesh point, through said cover, into said hollow interior of said second sun gear, and into contact with said first and second thrust washers.

24. The method according to claim 23, wherein
said cover includes a first portion and a second portion that are bolted together, and
said passageway includes a first opening extending through said first portion, a second opening extending through said first portion, and a cavity in said second portion interconnecting said first opening and said second opening,
such that forcing said oil from said mesh point, through said cover and into said hollow interior of said second sun gear comprises forcing said oil from said mesh point, through said first opening, then through said cavity, and then through said second opening into said hollow interior of said second sun gear.

25. The method according to claim 24, wherein
said planetary transmission further includes a first tubular extension extending from said second opening into said hollow interior of said second sun gear and toward said first thrust washer, and
forcing said oil from said mesh point, through said first opening, then through said cavity, and then through said second opening into said hollow interior of said second sun gear comprises forcing said oil from said mesh point, through said first opening, then through said cavity, then through said second opening, then through said first tubular extension into said hollow interior of said second sun gear.

26. The method according to claim 25, wherein
a hole is in a sidewall of said first tubular extension and positioned above said second thrust washer, and
forcing said oil through said first tubular extension into said hollow interior of said second sun gear comprises forcing said oil through said hole and through an open end of said first tubular extension into said hollow interior of said sun gear.

27. The method according to claim 25, wherein
said planetary transmission further includes a second tubular extension extending from said first opening toward the mesh point between the teeth of said second sun gear and the teeth of said at least one second planetary gear, and
forcing said oil from said mesh point through said first opening comprises forcing said oil from said mesh point, through said second tubular extension, and then through said first opening.

28. The method according to claim 24, wherein a third opening extends through said second sun gear from a root portion of teeth thereof to said hollow interior of said second sun gear, and said method further comprises:
forcing oil through said third opening into said hollow interior of said second gear.

29. A method of modifying a planetary transmission that includes
(i) a first gear set including a first sun gear and at least one first planetary gear in meshing arrangement with said first sun gear,
(ii) a second gear set including a second sun gear and at least one second planetary gear in meshing arrangement with said second sun gear, said second sun gear having a hollow interior,
(iii) a casing surrounding said first gear set and said second gear set, said casing including an opening in alignment with said second sun gear and a cover closing said opening,
(iv) a first thrust washer between said first sun gear and said second sun gear, and
(v) a second thrust washer between said second sun gear and said cover, said method comprising:
defining a passageway that extends through said cover and places said hollow interior of said second sun gear in fluid communication with a mesh point between teeth of said second sun gear and teeth of said at least one second planetary gear, such that when oil is forced from the mesh point the oil travels through said passageway, into said hollow interior of said second sun gear, and into contact with said first and second thrust washers.

30. The method according to claim 29, wherein defining a passageway that extends through said cover comprises
(i) forming in said cover a first opening that is aligned with the mesh point between the teeth of said second sun gear and the teeth of said at least one second planetary gear,
(ii) forming in said cover a second opening that is aligned with said hollow interior of said second sun gear, and
(iii) bolting a cover piece to said cover, with said cover piece having a cavity therein that interconnects said first opening and said second opening,
such that when oil is forced from the mesh point the oil travels through said first opening, then through said cavity, and then through said second opening into said hollow interior of said second sun gear.

31. The method according to claim 30, further comprising:
providing a first tubular extension that extends from said second opening into said hollow interior of said second sun gear and toward said first thrust washer.

32. The method according to claim 31, further comprising:
providing a hole in a sidewall of said first tubular extension, said hole being positioned above said second thrust washer.

33. The method according to claim 31, further comprising:
providing a second tubular extension that extends from said first opening toward the mesh point between the teeth of said second sun gear and the teeth of said at least one second planetary gear.

34. The method according to claim 30, wherein
said planetary transmission further includes an opening extending through said second sun gear from a root portion of teeth thereof to said hollow interior of said second sun gear.

35. A cover for covering an opening in a casing of a planetary transmission, comprising:
a passageway to be aligned with a mesh point between gear teeth and extending through said cover, said passageway being constructed and arranged to supply oil forced from the mesh point to a hollow interior of a sun gear of the planetary transmission so as to lubricate first and second thrust washers of the planetary transmission.

36. The cover according to claim 35, further comprising:
a first portion and a second portion that are bolted together,
wherein said passageway includes a first opening extending through said first portion, a second opening extending through said first portion, and a cavity in said second portion interconnecting said first opening and said second opening, such that oil is to flow through said first opening, then through said cavity, and then through said second opening into the hollow interior of the sun gear.

37. The cover according to claim 36, further comprising:
a first tubular extension extending from said second opening such that oil is to flow through said second opening, through said first tubular extension, and then into the hollow interior of the sun gear.

38. The cover according to claim 37, further comprising:
a hole in a sidewall of said first tubular extension such that oil is to flow through said hole and into contact with the second thrust washer.

39. The cover according to claim 37, further comprising:
a second tubular extension extending from said first opening such that oil is to flow through said second tubular extension and then through said first opening.

* * * * *